United States Patent
Hayami

(10) Patent No.: US 9,742,948 B2
(45) Date of Patent: Aug. 22, 2017

(54) IMAGE FORMING APPARATUS AND METHOD FOR DELETING APPLICATION

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/162,864

(22) Filed: May 24, 2016

(65) Prior Publication Data

US 2016/0360058 A1    Dec. 8, 2016

(30) Foreign Application Priority Data

Jun. 5, 2015    (JP) .................................. 2015-115039

(51) Int. Cl.
H04N 1/00    (2006.01)
H04L 29/08    (2006.01)

(52) U.S. Cl.
CPC ......... *H04N 1/00938* (2013.01); *H04L 67/32* (2013.01); *H04N 1/00941* (2013.01)

(58) Field of Classification Search
None
See application file for complete search history.

(56) References Cited

U.S. PATENT DOCUMENTS

| | | | |
|---|---|---|---|
| 8,966,472 B2 | 2/2015 | Hayami | |
| 2002/0077999 A1* | 6/2002 | Fergus | G06F 21/6209 |
| 2007/0008583 A1* | 1/2007 | Araki | G06F 8/20 358/1.15 |
| 2007/0255760 A1* | 11/2007 | Itoh | G06F 17/3012 |
| 2007/0294687 A1* | 12/2007 | Masselle | G06F 8/62 717/174 |
| 2011/0154491 A1* | 6/2011 | Hernacki | G06F 21/568 726/23 |
| 2012/0151174 A1* | 6/2012 | Matsunaga | G06F 3/0644 711/171 |
| 2014/0067879 A1* | 3/2014 | Ahn | G06F 17/30312 707/812 |
| 2014/0222980 A1* | 8/2014 | Hagiwara | H04L 41/0803 709/222 |
| 2014/0223315 A1* | 8/2014 | Hagiwara | H04L 41/085 715/736 |
| 2014/0237564 A1* | 8/2014 | Dudziak | H04L 63/08 726/6 |
| 2014/0304313 A1* | 10/2014 | Choi | G06F 17/301 707/827 |
| 2014/0366034 A1* | 12/2014 | Fujisawa | G06F 9/5016 718/104 |
| 2015/0242721 A1 | 8/2015 | Hayami | |
| 2015/0339112 A1* | 11/2015 | Ryu | G06F 8/62 717/174 |

(Continued)

FOREIGN PATENT DOCUMENTS

JP    H09-034755 A    2/1997

*Primary Examiner* — Ming Hon
(74) *Attorney, Agent, or Firm* — Fitzpatrick, Cella, Harper & Scinto

(57) ABSTRACT

There is provided an image forming apparatus capable of adding and deleting applications, the apparatus comprising: a designating unit configured to designate an application and a file to be deleted; and a deleting unit configured to delete a designated file associated with the application designated by the designating unit.

18 Claims, 17 Drawing Sheets

(56) References Cited

U.S. PATENT DOCUMENTS

2015/0355894 A1 12/2015 Hayami
2016/0139907 A1* 5/2016 Kumano ................. H04L 67/34
717/174

* cited by examiner

FIG. 9

| CLEAR TYPE NUMBER | CLEAR DESIGNATION FILE CONTENT | CASE |
|---|---|---|
| 0 | TargetApp:all<br>Action:all | CASE9 |
| 1 | TargetApp:system, login1<br>Action:jar | CASE1 |
| 2 | TargetApp:system, login1<br>Action:all | CASE3 |
| 3 | TargetApp:normal, login2<br>Action:data | CASE5 |
| 4 | TargetApp:normal, login2<br>Action:all | CASE6 |

F I G. 12
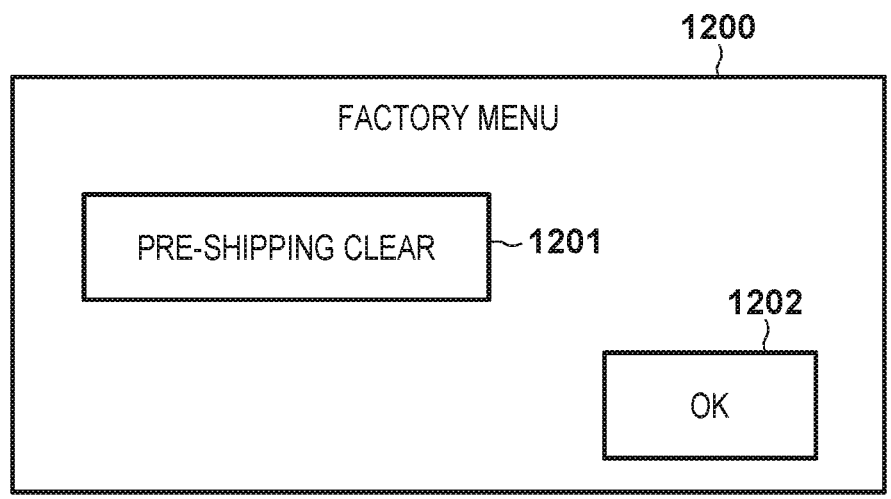
F I G. 13
F I G. 14
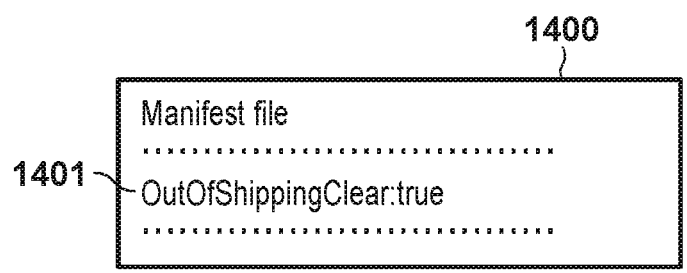

IMAGE FORMING APPARATUS AND METHOD FOR DELETING APPLICATION

BACKGROUND OF THE INVENTION

Field of the Invention

The present invention relates to an image forming apparatus in which, for example, an application can be installed, and to a method for clearing a loading region for application programs (called "applications" hereinafter).

Description of the Related Art

In recent years, application operating environments such as the Java (registered trademark (omitted hereinafter)) environment are being provided in image forming apparatuses. Techniques for providing extensible applications using the program portability of Java are being proposed. To improve the functionality and usability of an image forming apparatus, creating an application that operates under an environment such as the stated Java environment and installing that application in the image forming apparatus makes it possible to implement desired functions using the application. The OSGi (Open Services Gateway Initiative) Service Platform (called simply "OSGi" hereinafter), which is a Java application platform aimed at embedded devices, is an example of an application platform. OSGi defines a "bundle" as a unit for managing software modules, and also defines specifications for managing a "life cycle", which includes installing/starting/stopping/updating/uninstalling. Here, "bundle" refers to a Java module and in the present specification is the same as an application. As such, applications will be referred to as bundles hereinafter. Such an application platform can provide embedded functions such as copying, scanning, printing, and the like to a bundle.

When a problem occurs with a bundle in such an image forming apparatus, one possible method of handling the problem is a repairperson clearing a bundle loading region of a storage device to delete the data held by the bundle, and then attempting to restore functionality. A method for easily selecting and deleting files to be deleted has been proposed, as disclosed by Japanese Patent Laid-Open No. 09-034755. Furthermore, a method that deletes both the bundle loading region and the data held by the bundle at once can be considered in order to eliminate the need for the repairperson to select the files to be deleted.

However, in the latter case, it is possible that the data of a bundle clearly unrelated to the problem will be erased as well. Furthermore, bundles that were installed later must also be reinstalled after the data has been erased, which is troublesome for users.

SUMMARY OF THE INVENTION

The present invention provides an image forming apparatus and a method for deleting applications that improve operability by simplifying the selection of data to be deleted, and effectively delete a desired application while leaving behind, to the greatest extent possible, applications (or loading regions thereof) unrelated to the solution of a problem.

The present invention has the following configuration.

According to one aspect of the present invention, there is provided an image forming apparatus capable of adding and deleting applications, the apparatus comprising: a designating unit configured to designate an application and a file to be deleted; and a deleting unit configured to delete a designated file associated with the application designated by the designating unit.

According to the present invention, an application and a target of deletion can be effectively designated through a simple operation, and the target of deletion related to the designated application can be deleted.

Further features of the present invention will become apparent from the following description of exemplary embodiments with reference to the attached drawings.

BRIEF DESCRIPTION OF THE DRAWINGS

FIG. 9 is a table indicating relationships between clear type numbers and content written in clear designation files.

FIG. 12 is a diagram illustrating a UI for designating a pre-shipping clear carried out when shipping from a factory.

FIG. 13 is a diagram illustrating an example of the content of a clear designation file used in the pre-shipping clear.

FIG. 14 is a diagram illustrating a manifest designating whether or not there is an exception for the pre-shipping clear.

DESCRIPTION OF THE EMBODIMENTS

Hereinafter, embodiments of the present invention will be described with reference to the drawings.

First Embodiment

Hardware Configuration of Image Forming Apparatus

Figure 1:
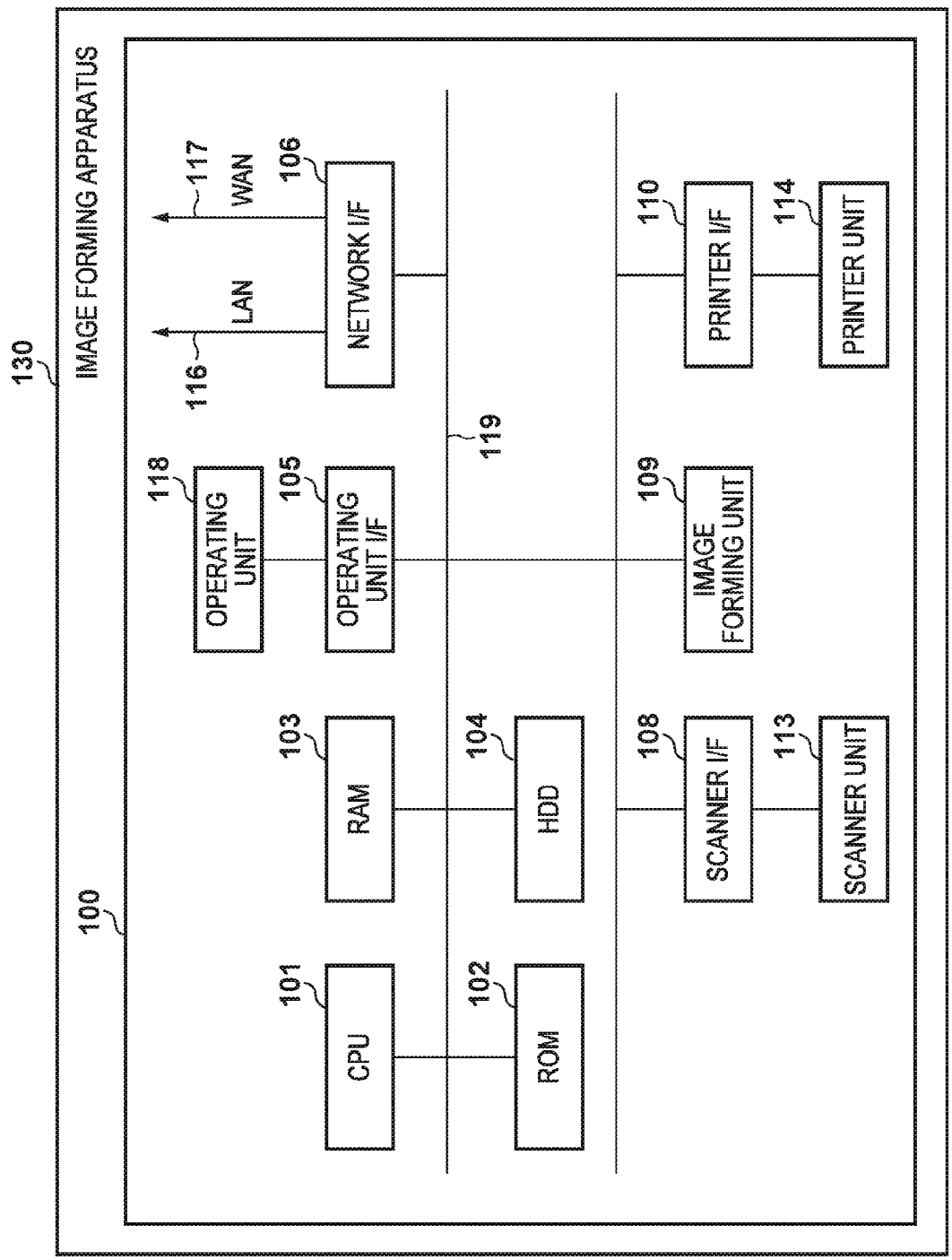
FIG. 1 is a diagram illustrating the hardware configuration of an image forming apparatus.

FIG. 1 is a diagram illustrating the hardware configuration of an image forming apparatus 130 that includes a printing function, a scanning function, a network communication function, and the like. In FIG. 1, a controller 100 is a controller of the image forming apparatus 130. The controller 100 is electrically connected to a scanner unit 113, a printer unit 114, and the like, and is also connected to external devices over a LAN 116.

Figure 3:
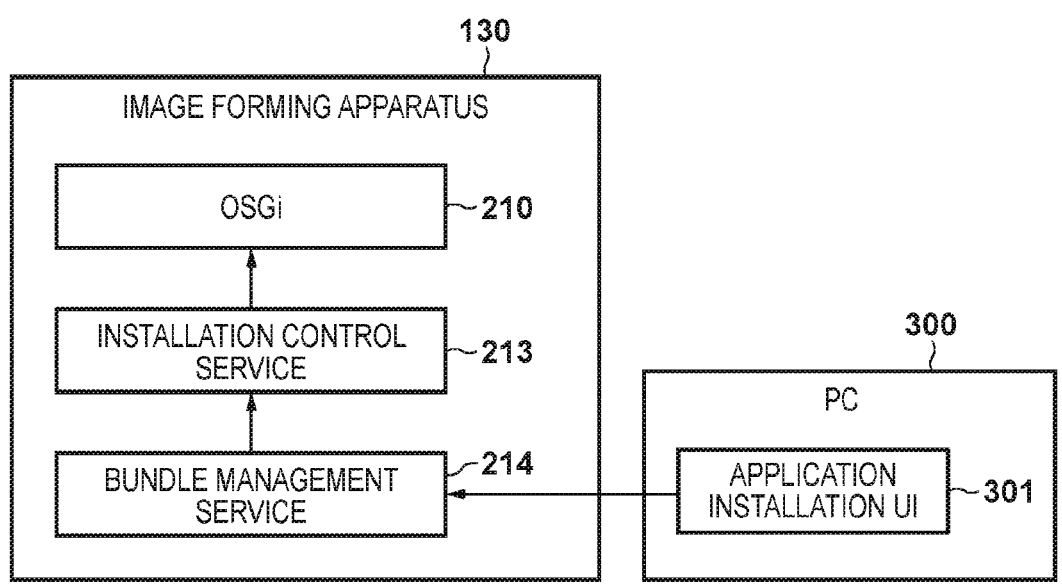
FIG. 3 is a block diagram illustrating a flow through which a bundle is installed.

A CPU 101 performs overall control of access to various types of connected hardware on the basis of control programs and the like stored in a ROM 102, and also performs overall control of various types of processes carried out within the controller. The ROM 102 is a read-only non-volatile storage region, and stores a boot program, firmware, and the like for the image forming apparatus 130. A RAM 103 is a system work memory used for operations of the CPU 101, and is a memory that temporarily stores various types of data. The RAM 103 is constituted of FRAM (registered trademark) or SRAM, which is capable of retaining stored content even after power has been turned off, DRAM, whose stored content is lost after power is turned off, or the like. An HDD 104 is a non-volatile storage region, and stores system bundles and the like. Firmware, which includes applications, called bundles, to be installed as illustrated in FIG. 3, is stored in the HDD 104.

An operating unit I/F 105 is an interface unit for connecting a system bus 119 and an operating unit 118. Specifically, the operating unit I/F 105 receives data to be displayed in the operating unit 118 from the system bus 119 and displays the data, and outputs input information from the operating unit 118 to the system bus 119. The operating unit 118 is used by a user to make instructions to the image forming apparatus 130, provide information to the image forming apparatus 130, and so on. A network I/F 106 is connected to the LAN 116, a WAN 117, and the system bus 119, and inputs/outputs information from/to the exterior. A scanner I/F 108 corrects, processes, and edits image data received from the scanner unit 113. An image forming unit 109 performs vector conversion, image compression and decompression, and so on image data. A printer I/F 110 receives image data sent from the image forming unit 109 and prints the image data through the printer unit 114 after an image has been formed.

Software Modules of Image Forming Apparatus

Figure 2:
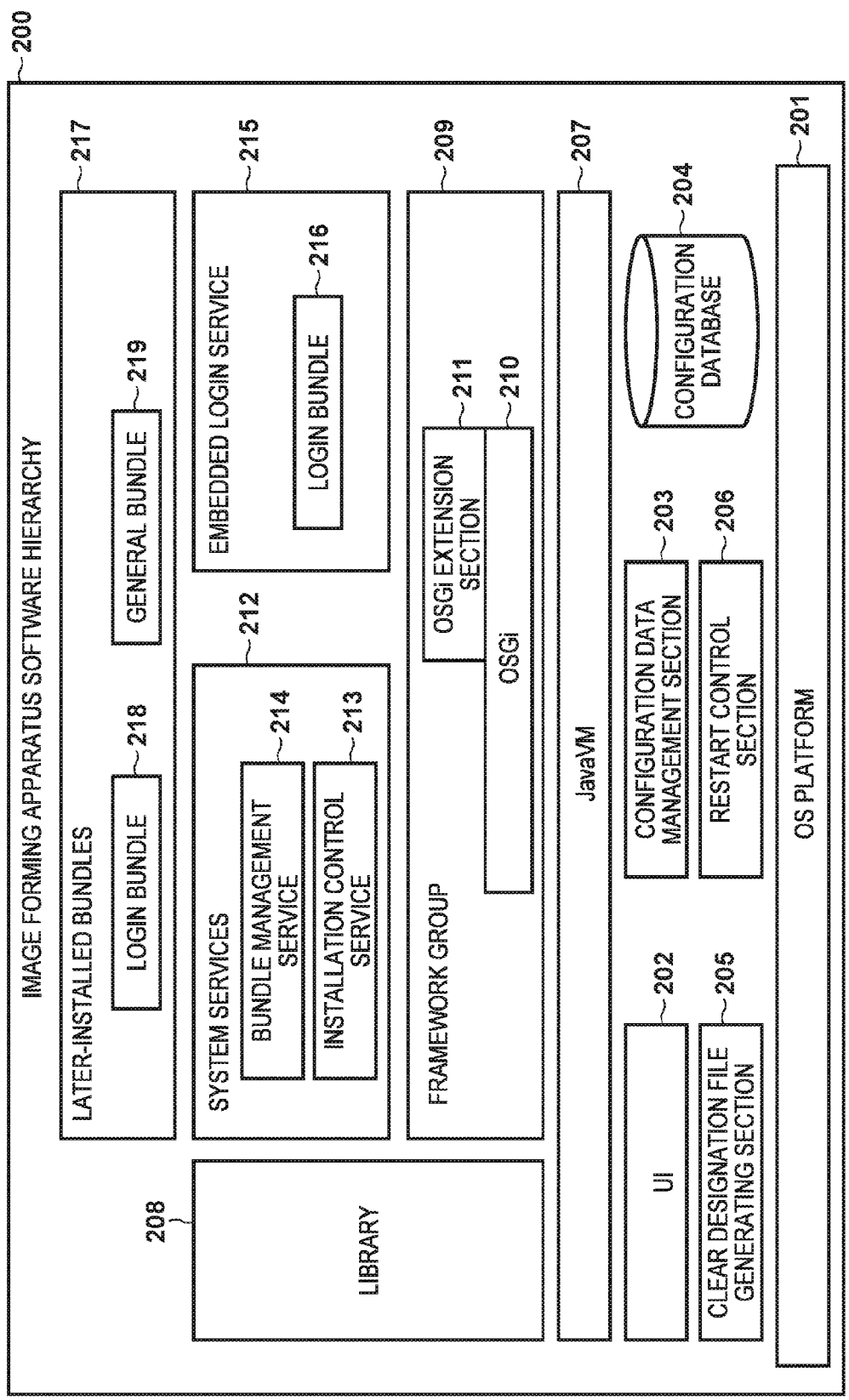
FIG. 2 is a diagram illustrating a software module hierarchy of the image forming apparatus.

FIG. 2 is a diagram illustrating a software module hierarchy of the image forming apparatus 130 according to the present invention. Note that the software illustrated in FIG. 2 and on is stored in the ROM 102 or the HDD 104 and executed by the CPU 101. Various types of information used during execution is stored in the RAM 103 or the HDD 104, and the various types of information are exchanged among software functions. Furthermore, communication with external devices is carried out using the network I/F 106.

Each piece of software will be described next. First, the software includes an operating system (OS) platform 201. A UI 202 is a user interface module, and is a module that interfaces between the apparatus and user operations when an operator makes various types of operations and settings in the image forming apparatus 130. This module forwards input information to the various modules described later to make processing requests, changes data configurations, or the like in accordance with operations made by the operator. A configuration database 204 is a database that handles configuration data of the image forming apparatus 130. A value of a clear type, which will be described later, is also held in this database. This data is managed by a configuration data management section 203, with each bundle being able to obtain data by querying the configuration data management section 203 for a data value. A clear designation file generating section 205 is a module that generates a clear designation file indicating a target for clearing when a clear is executed from a menu. A restart control section 206 is a module that restarts the image forming apparatus 130 in response to a restart command.

Next, the configuration of Java will be described. The Java software platform is configured as a runtime environment of a Java VM 207, including the Java VM 207 as an interpreter, a library 208, and a framework group 209. The library 208 is configured so as to include a standard API library. The framework group 209 is configured so as to include OSGi 210, and the OSGi 210 runs multiple bundles in the single Java VM 207. Furthermore, an OSGi extension section 211 indicates that the functions of the OSGi 210 are extensible as necessary. The OSGi 210 and OSGi extension section 211 provide management of bundle life cycles, functions for communicating between bundles, and so on.

Figure 4:
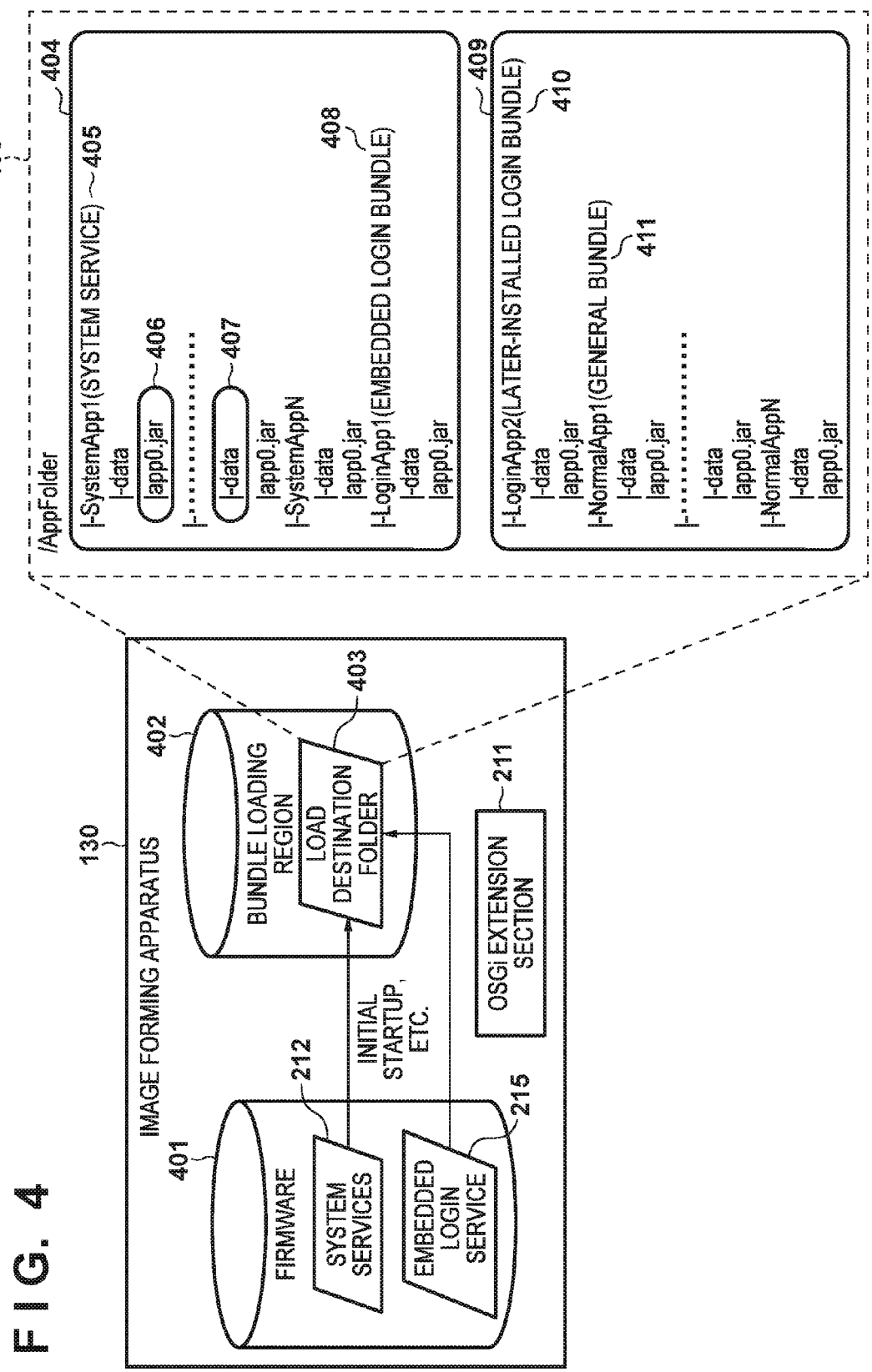
FIG. 4 is a block diagram illustrating the installation of a bundle and a bundle loading region where the bundle is installed.

Multiple system services 212 and an embedded login service 215 are provided on the OSGi 210. These are installed by the OSGi extension section 211 from stored firmware when there is no load destination folder upon an initial startup or when an update flag indicating an update is necessary is present in a predetermined location. This installation is illustrated in FIG. 4.

A bundle management service 214 for managing multiple bundle groups and adding new bundles and updating or deleting bundles is one of the system services 212. The bundle management service 214 adds, updates, and deletes bundles using an installation control service 213.

A login bundle 216 that can be used for standard authentication is installed as the embedded login service 215. Because login information may be queried at any time from any given bundle while a user is logged in, the login bundle 216 is a bundle having a property whereby the bundle cannot be stopped. If, for instance, the login bundle 216 is stopped, the login information cannot be obtained; thus if there is a bundle using data associated with the login information, the data obtainment will fail and an operational error will occur. Here, "login information" refers to information such as a login name, an email address, and the like of a user currently logged in to the image forming apparatus 130. Because the bundle has a property whereby it cannot be stopped as described above, only a single instance of the login bundle 216 always runs when the image forming apparatus 130 is running.

Meanwhile, there are later-installed bundles 217, which are a type that is installed later. Installation of bundles is illustrated in FIG. 3. As one of the later-installed bundles 217, a general bundle 219 is an additional application that provides various types of processes to the user in the image forming apparatus 130. For example, there are image processing and compression bundles, bundles for departmental management such as printing restrictions, and so on. It is also possible to install a later-installed login bundle 218 that changes with respect to the standard login bundle 216.

The general bundle 219 that implements the various types of functions, and the later-installed login bundle 218 operate under the management of the bundle management service 214. The bundle management service 214 holds bundle information, license information, and so on including the versions of bundles added under this management.

Bundle Installation

FIG. 3 is a block diagram illustrating a flow through which a user installs a bundle in the image forming apparatus 130 from a PC 300. An application installation UI (user interface) 301 is displayed in a web browser of the PC 300, and the bundle to be installed is designated in this application installation UI 301 and installed. Having received the bundle designated through the application installation UI 301, the bundle management service 214 passes the bundle to the installation control service 213. Having received the bundle file, the installation control service 213 requests the OSGi 210 to install the bundle, and the OSGi 210 installs the designated bundle. The installed bundle is then managed by the bundle management service 214.

Example of Bundle Loading Region

FIG. 4 is a block diagram illustrating a flow of the OSGi extension section 211 installing the system services 212 and the embedded login service 215 into a bundle loading region 402 from firmware, and the post-load bundle loading region, in the image forming apparatus 130. A load destination folder 403 is present in the bundle loading region 402. However, the load destination folder 403 is normally created by the OSGi extension section 211 at the time of an initial startup. In the case where the load destination folder 403 is not present at the time of an initial startup, an update flag is detected in a predetermined location, or the like, the OSGi extension section 211 installs the system services 212 and embedded login service 215 stored in firmware 401 into the load destination folder 403 within the bundle loading region 402. As a result, the life cycle is managed through the OSGi 210. In the case where the installation is an update, the installation is carried out as an overwrite when a bundle having an existing bundle ID is loaded. Note that the update flag is set in a predetermined storage location in the case where the installation is an update.

Next, a loaded bundle group 404, which is subordinate to an AppFolder serving as the load destination folder 403 and is loaded from the firmware 401, will be described. The OSGi extension section 211 creates a folder having a unique folder name for each installed bundle. This folder will be called a bundle directory hereinafter. In the case of FIG. 4, a system service 405 is installed in a bundle directory called "SystemApp1". An installed jar 406 is located immediately below the bundle directory, with the name "app0.jar". A data folder 407 used by each bundle for storing data is also located here. An embedded login bundle 408 is also installed with the same configuration as the system service 405.

A later-installed bundle group 409 installed by a user later through the method illustrated in FIG. 3 will be described next. A later-installed login bundle 410 is also installed with the same configuration as the system service 405. Likewise, a general bundle 411 is also installed with the same configuration as the system service 405.

In this manner, a bundle is installed in a folder (directory) for that bundle. The installed files include a jar file and a data folder, and these are referred to collectively as "bundle-associated files". Note that the jar file is a file in which Java (registered trademark) bytecode (the actual program content, in other words) and resources used thereby are archived together, and can also be referred to as the bundle, or in other words, as the application program itself.

Flow of Erasing Bundle Loading Region

Figure 5:
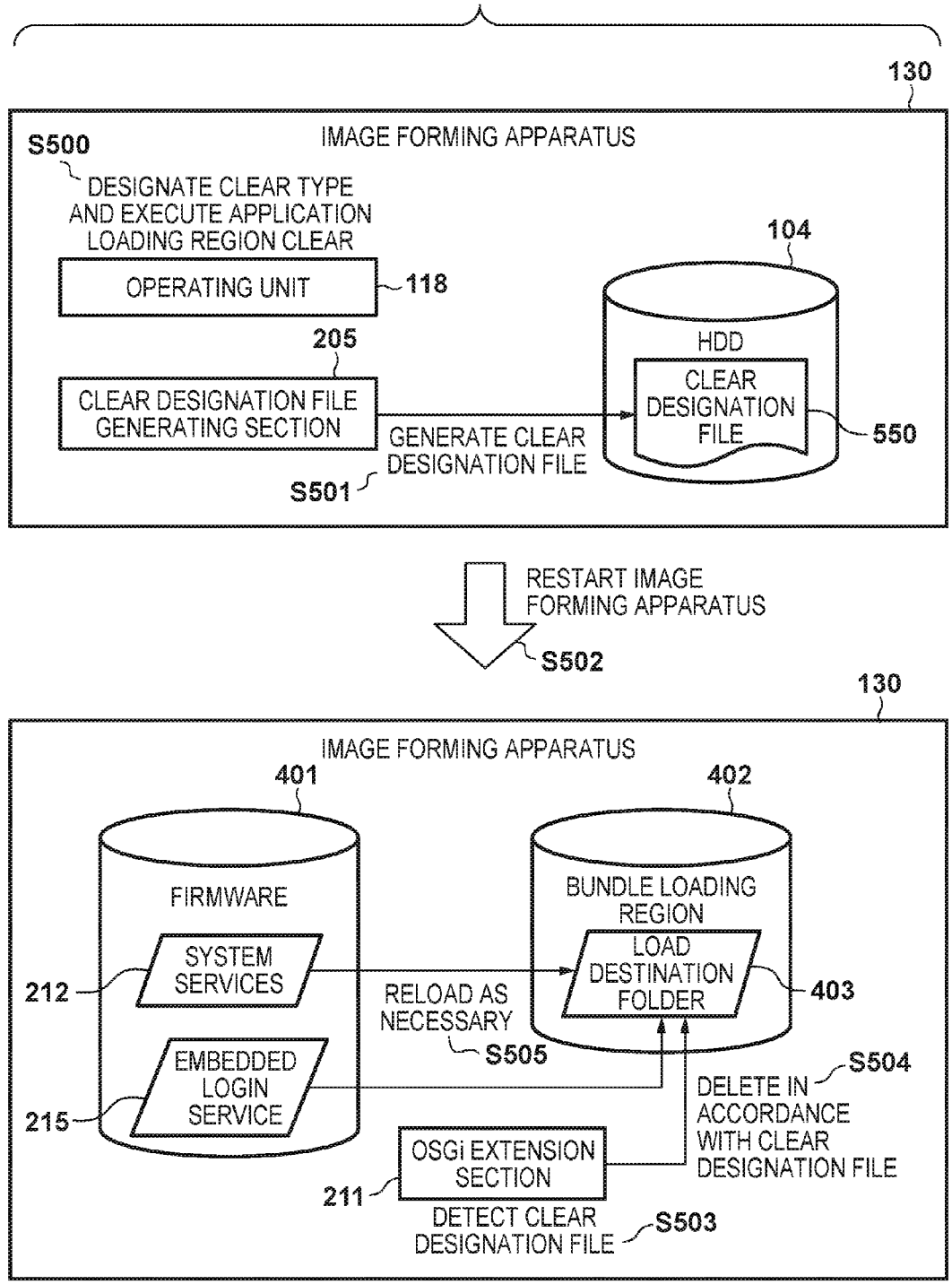
FIG. 5 is a block diagram illustrating overall operations when erasing a bundle loading region.
Figure 6:
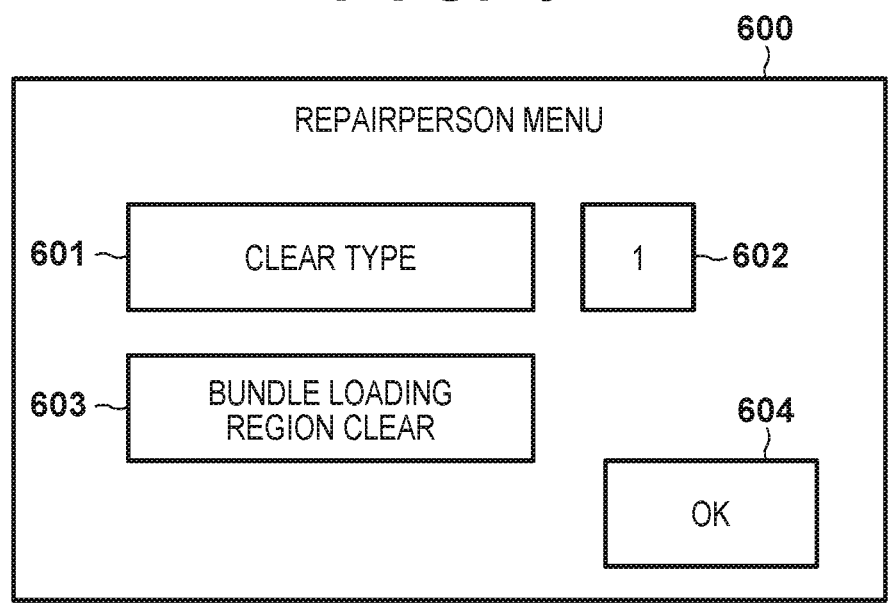
FIG. 6 is a diagram illustrating a UI for designating a clear type.

FIG. 5 is a block diagram illustrating an overall flow when erasing the bundle loading region 402. In S500, a clear type, indicating a clear target, is designated, and the execution of the bundle loading region clear is designated, through the operating unit 118. A UI for the designation method is indicated in FIG. 6. Upon an execution instruction being received from the UI, in S501, the clear designation file generating section 205 generates a clear designation file 550 in a predetermined location of the HDD 104 in accordance with the designated clear type number. FIG. 9 illustrates a relationship between the clear type number and the content written in the clear designation file 550. Then, in S502, the image forming apparatus 130 is restarted by the user. After the restart, in S503, when the OSGi extension section 211 detects the clear designation file 550, the target for deletion in the load destination folder 403 of the bundle loading region 402 is deleted in accordance with the designation written in that clear designation file 550.

Then, in S505, the system services 212 and the embedded login service 215 stored in the firmware 401 are reloaded into the bundle loading region as necessary.

UI for Designating Clear Type

FIG. 6 is a diagram illustrating a UI (clear designation UI) 600, displayed in the operating unit 118, for designating a clear type. A repairperson menu 600 is a menu displaying a list of functions necessary for a repairperson. The following operations are carried out in the case where a user has attempted to erase the bundle loading region 402. After a clear type 601 has been selected, a code such as a clear type number 602 is input, and an OK button 604 is pressed. Then, after bundle loading region clear 603 is selected, the OK button 604 is pressed. This operation creates the clear designation file 550, which is then stored in a predetermined storage location. Then, when the image forming apparatus 130 is restarted, the target bundle in the bundle loading region 402 is deleted in accordance with the selection. In this manner, an application and a deletion target, or in other words, a file to be deleted that is associated with the application, can be designated through the user interface illustrated in FIG. 6. As will be described later, the file to be deleted includes a folder.

Figure 7:
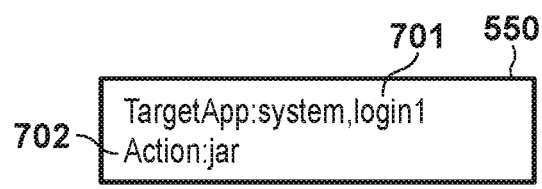
FIG. 7 is a diagram illustrating an example of the content of a clear designation file.

FIG. 7 is a diagram illustrating an example of the content of the clear designation file 550. Bundle designation 701 indicating the deletion target designates a bundle type (system,login1, in FIG. 7) after a key character string indicating that the bundle is to be deleted (TargetApp). Action designation 702 designates a key character string indicating the details to be executed on the bundle that is the deletion target (Action) and the content (jar, in FIG. 7).

Bundle Designation and Action Designation

Figure 8:
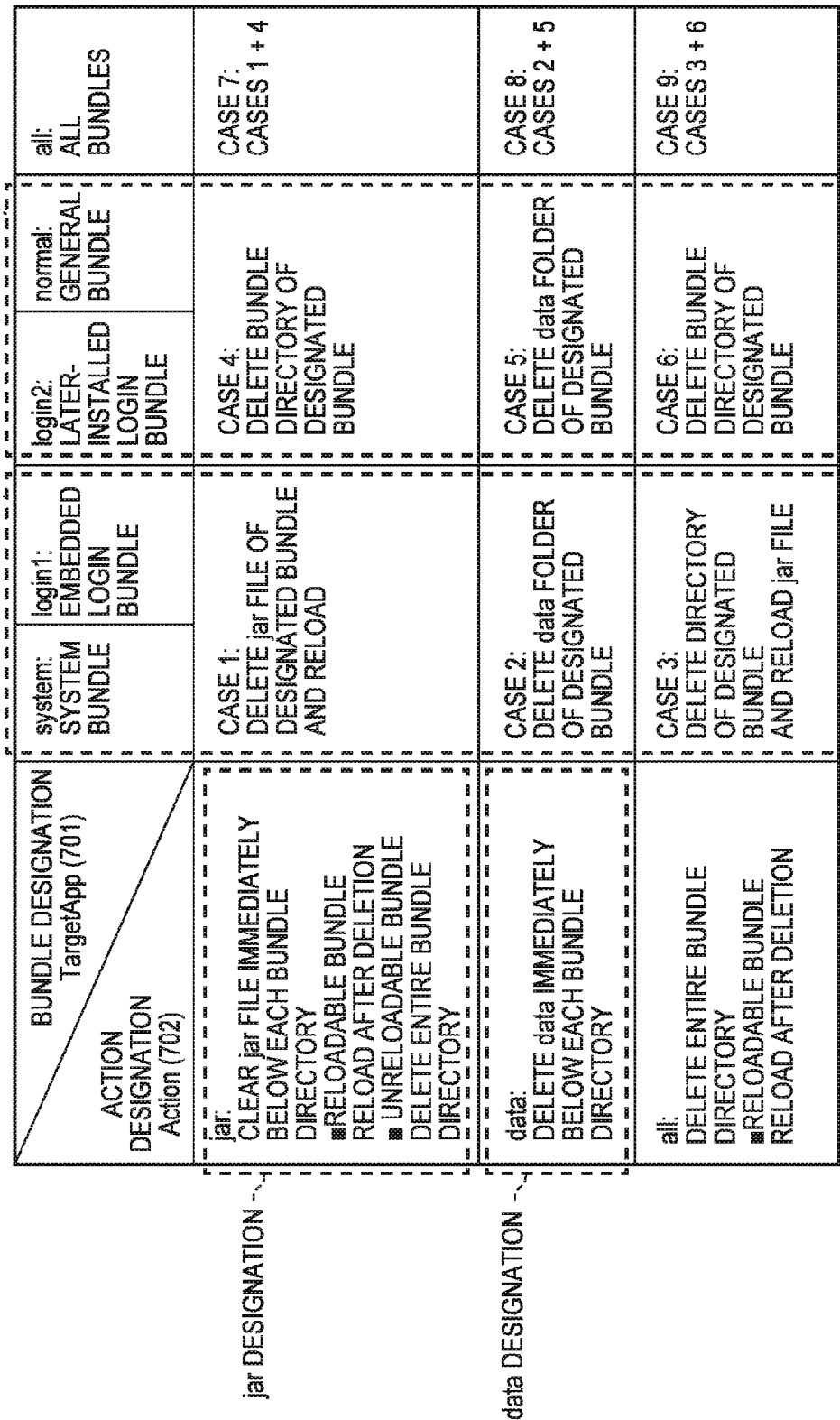
FIG. 8 is a table illustrating bundle designations and action designations designated by a clear designation file.

FIG. 8 is a table illustrating the bundle designation 701 and the action designation 702 designated in the clear designation file 550. The bundle designation 701 (TargetApp) designates which bundle is to be the target for deletion. As method for classifying the deletion targets, it is assumed that the designation can be made by bundle type. In this case, one of the system bundle (system), embedded login bundle (login1), later-installed login bundle (login2), general bundle (normal), and all bundles (all) can be selected. It is also assumed that multiple targets can be designated by bundle designation 701. In the example illustrated in FIG. 7, two types of bundles, namely system and login1, are designated as deletion targets. The system bundle can also be called part of the system, and is therefore reinstalled when the image forming apparatus is restarted even if all of the bundles have been cleared. The login bundle implements services related to logins, such as providing information regarding a user who is logged in, for example. "General bundle" refers to other bundles, and can be installed or uninstalled at a later date.

Meanwhile, the action designation 702 (Action) designates what action will be executed for the target bundle 701. In the case where "jar" is designated by the action designation 702, a jar file 406 directly below each bundle directory is deleted. In this case, a reloadable bundle 802 in which the original jar is present in the firmware 401, such as a system bundle or an embedded bundle, is reloaded. To that end, the update flag is set in a predetermined location. On the other hand, the jar file cannot be reloaded for an unreloadable bundle 803, such as a later-installed login bundle or a general bundle. Accordingly, even if the data folder is left, that folder will have no subsequent use, which is expected to result in unnecessary files remaining. Accordingly, in the case where "jar" is designated for the unreloadable bundle 803, the bundle directory itself is deleted.

Meanwhile, in the case where "data" is designated by the action designation 702, the data folder 407 directly below each bundle directory is deleted.

In the case where all is designated by the action designation 702, the entire bundle directories of all installed bundles are deleted. The reloadable bundles 802 are reloaded in the same manner as when "jar" is designated. To that end, the update flag is set in a predetermined location. In light of the foregoing, specific cases will be described next.

When TargetApp=system and login1/Action=jar are designated as in case 1, the jar files of the system bundle and the embedded login bundle are deleted. The deleted jar files are reloaded from the firmware 401 by the OSGi extension section 211 in a subsequent startup process.

When TargetApp=system and login1/Action=data are designated as in case 2, the data folders held in the bundle directories of the system bundle and the embedded login bundle are deleted.

When TargetApp=system and login1/Action=all are designated as in case 3, the entire bundle directories of the system bundle and the embedded login bundle are deleted. The deleted bundle directories and jar files are reloaded from the firmware 401 by the OSGi extension section 211 in a subsequent startup process.

When TargetApp=login2 and normal/Action=jar are designated as in case 4, the entire bundle directories of the later-installed login bundle and the general bundle are deleted.

When TargetApp=login2 and normal/Action=data are designated as in case 5, the data folders held in the bundle directories of the later-installed login bundle and the general bundle are deleted.

When TargetApp=login2 and normal/Action=all are designated as in case 6, the entire bundle directories of the later-installed login bundle and the general bundle are deleted. This is the same operation as in case 4.

When TargetApp=all/Action=jar are designated as in case 7, the jar file of the reloadable bundle 802 is deleted. The deleted jar file of the reloadable bundle is reloaded from the firmware 401 by the OSGi extension section 211 in a subsequent startup process. On the other hand, the entire bundle directory of the unreloadable bundle 803 is deleted.

When TargetApp=all/Action=data are designated as in case 8, the data folders of all bundles are deleted.

When TargetApp=all/Action=all are designated as in case 9, the entire bundle directories of all bundles are deleted. For the reloadable bundle 802, the bundle directories and jar files are reloaded from the firmware by the OSGi extension section 211 in a subsequent startup process.

Clear Type Number

FIG. 9 is a table indicating relationships between clear type numbers designated through the clear designation UI 600 and content written in clear designation files. For example, in the case where the clear type number is 0, the details indicated in case 9 in FIG. 8 are written in the clear designation file. By enabling the clear type to be designated in this manner, it is possible to attempt to reload a jar without deleting data, for example. Accordingly, in the case where a bundle has caused a problem to arise in the image forming apparatus 130, selecting, for example, the clear type 1 makes it possible to attempt to reload the jar only without deleting the data, rather than past situations where it was necessary to erase the entire bundle loading region. This has an advantage in that if the problem is solved, it is no longer necessary to wastefully delete data. Meanwhile, selecting the clear type 3 makes it possible to attempt deleting only the data for an unreloadable bundle, which must be reinstalled once it has been deleted. This has an advantage in that if the problem is solved, the burden of reinstalling the bundle is reduced.

Associating all of the cases 1 to 9 indicated in the table illustrated in FIG. 8, or some representative cases, with clear type numbers in this manner makes it possible to designate a target for deletion in the clear designation UI 600 using a simple code. These associations can, for example, be carried out by registering a clear type number and a set including the bundle designation 701 and action designation 702 written in the clear designation file 550 as a table, as illustrated in FIG. 9. Of course, the association may be carried out using another method, such as hard coding the associations in a program. The bundle designation 701 and action designation 702 associated with the designated clear type number are then written in the clear designation file 550 in accordance with this association. Note that in the example illustrated in FIG. 8, if the clear type numbers are assigned to cases so that the cases 1 to 5 can be designated, the cases 6 to 9 can be covered as well. This is because the same processes are carried out in cases 6 and 4, whereas cases 7 to 9 can be realized by carrying out operations multiple times having designated clear type numbers with different bundle designations so that all bundles are covered.

Deletion Process Sequence

Figure 10:
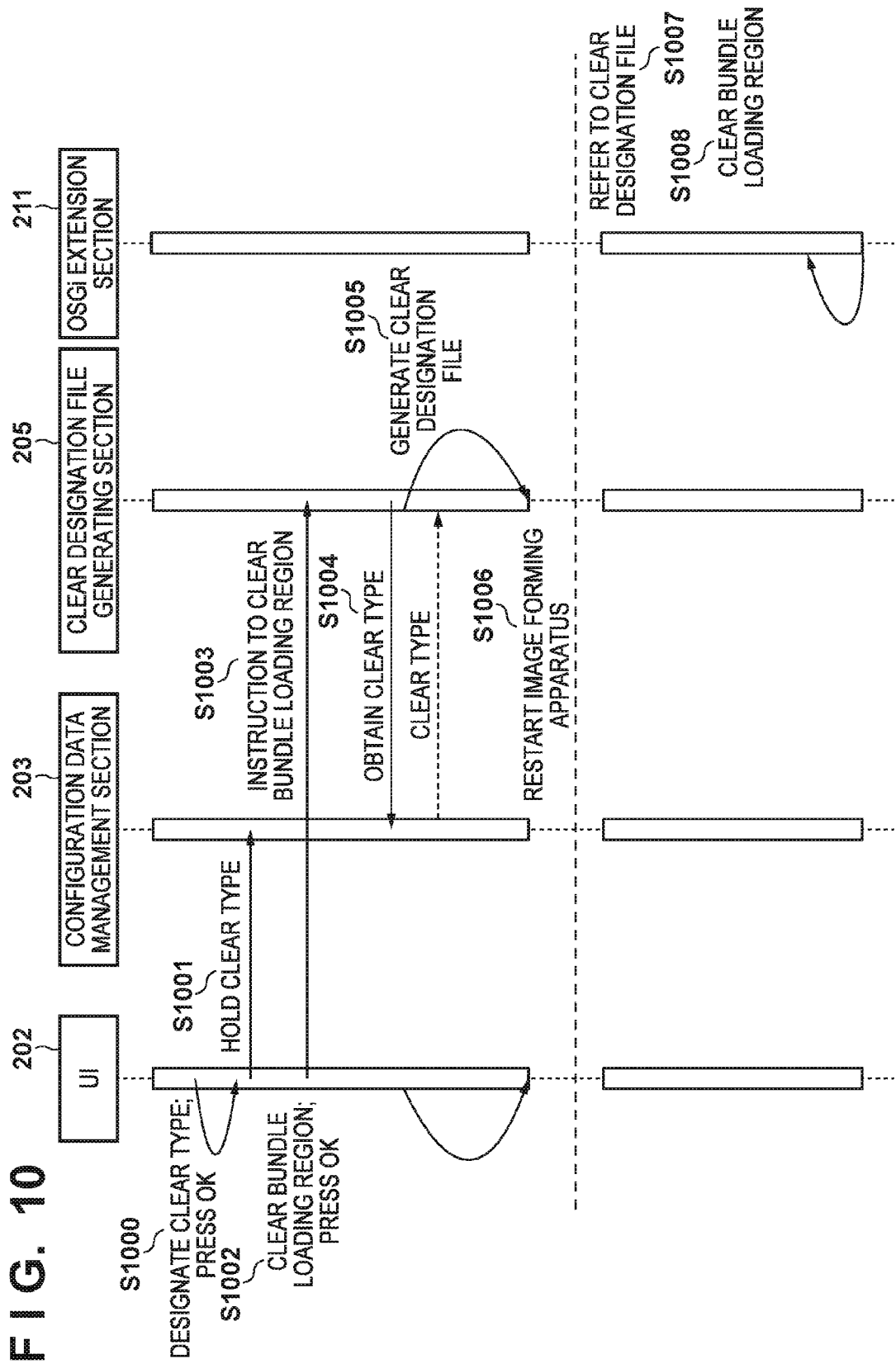
FIG. 10 is a sequence chart illustrating a sequence from the designation of a clear type number to a post-restart erasure process.

FIG. 10 is a sequence chart illustrating a sequence from the designation of a clear type number to a post-restart deletion process. In S1000, the user selects the clear type 601 from the UI 202, and while that selection is active, inputs the clear type number 602 and presses the OK button. In S1001, the UI requests the configuration data management section 203 to store the input clear type number in the configuration database 204. In S1002, the user selects bundle loading region clear, and presses the OK button while that selection is active. In S1003, the UI instructs the clear designation file generating section 205 to clear the loading region. In S1004, the clear designation file generating section 205 obtains the value of the clear type designated by the configuration data management section 203 (the clear type number). In S1005, the clear designation file generating section 205 generates the clear designation file 550 on the basis of the obtained clear type value. In other words, the bundle designation 701 and the action designation 702 associated with the clear type number are written in the clear designation file 550. In S1006, the user restarts the image forming apparatus 130. In S1007, the OSGi extension section 211 refers to the clear designation file 550. In S1008, the OSGi extension section 211 erases the bundle loading region 402 in accordance with the designation made by the clear designation file 550. A flow of the OSGi extension section 211 in S1007 and S1008 is illustrated in FIG. 11.

Flow of Erasing Bundle Loading Region by OSGi Extension Section

Figure 11:
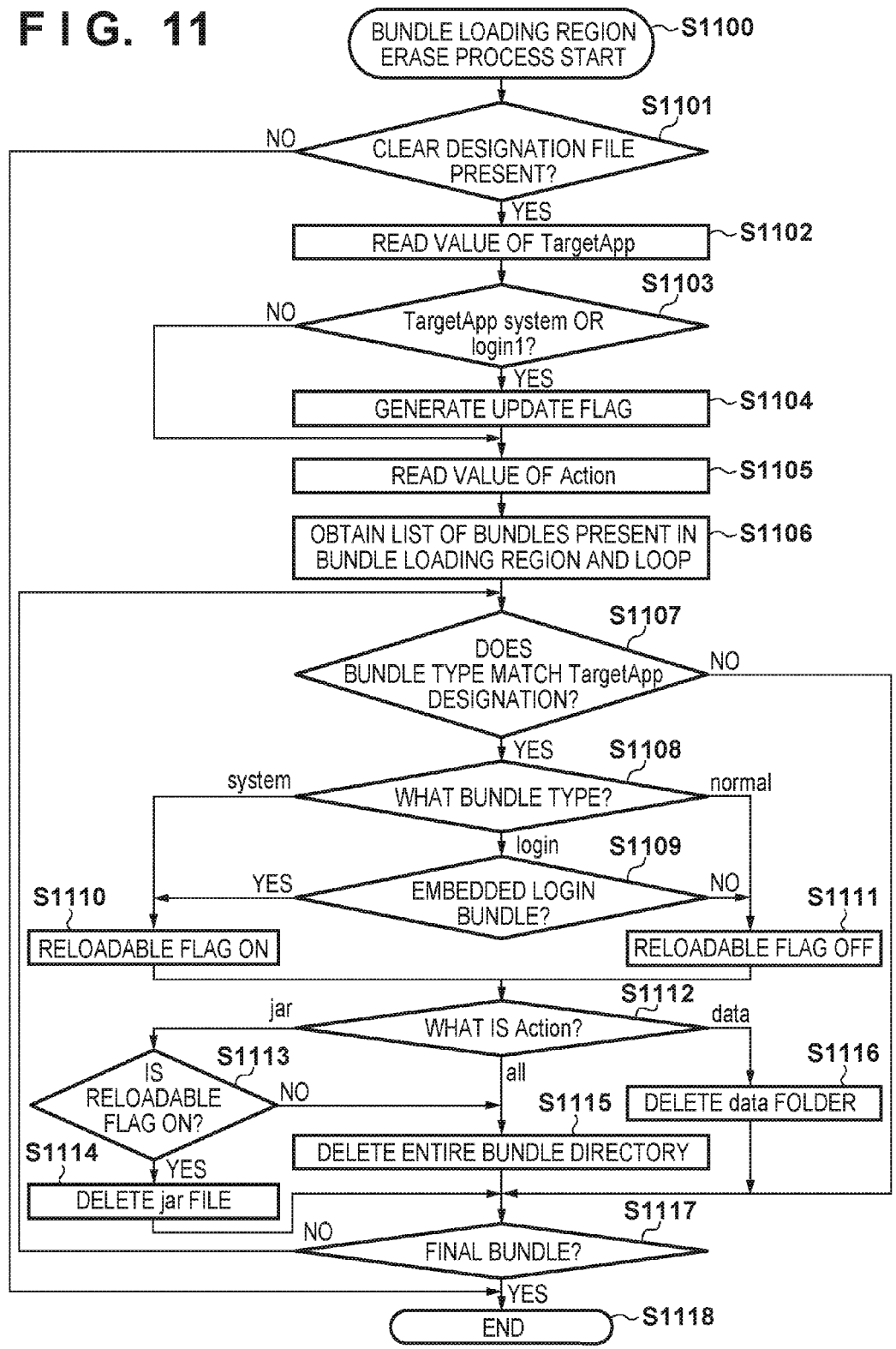
FIG. 11 is a flowchart illustrating a process carried out when an OSGi extension section 211 erases a bundle loading region upon startup.

FIG. 11 is a flowchart illustrating a process carried out when the OSGi extension section 211 erases the bundle loading region upon startup. The bundle loading region deletion process is started in S1100. In S1101, the OSGi extension section 211 checks whether or not the clear designation file 550 is present. The process moves to S1118 and ends in the case where the clear designation file 550 is not present. However, the process moves to S1102 in the case where the clear designation file 550 is present. In S1102, the OSGi extension section 211 reads the value of the bundle designation (also called "TargetApp" hereinafter) 701 from the clear designation file 550 and secures the value in memory, after which the process moves to S1103. In S1103, in the case where the value of TargetApp 701 is system, or in other words, a system bundle, or is login1, or in other words, is an embedded login bundle, the process moves to S1104, and the update flag is generated. As a result, a process for reloading from the firmware 401 is run in a subsequent startup process performed by the OSGi extension section 211. In S1105, the OSGi extension section 211 reads the value of the action designation (also called "Action" hereinafter) 702 from the clear designation file 550 and secures the value in memory, after which the process moves to S1106. In S1106, the OSGi extension section 211 obtains a list of the bundles installed in the bundle loading region; the process then moves to S1107, where each bundle is taken as a bundle to be processed, and a looped process is carried out with the bundle being processed being changed in sequence.

In S1107, it is checked whether or not the bundle type of the bundle being processed matches TargetApp 701. The bundle type is one of a general bundle (normal), a login bundle (login), and a system bundle (system). In the case where "normal" is designated in TargetApp 701, and the bundle type is "general bundle", there is a match. In the case where "login1", or in other words, an embedded login bundle, or "login2", or in other words, a later-installed login bundle is designated in TargetApp 701, and the bundle type of the bundle being processed is "login bundle", there is a match. In the case where "system", or in other words, a system bundle is designated in TargetApp 701, and the bundle type of the bundle being processed is "system bundle", there is a match. If there is no match in S1107, the process moves to S1117. However, in the case where there is a match in S1107, the process moves to S1108.

In S1108, in the case where the bundle type of the bundle being processed is "system", or in other words, a system bundle, the process moves to S1110, where a reloadable flag is set to ON. In S1108, in the case where the bundle type is "normal", or in other words, a general bundle, the process moves to S1111, where the reloadable flag is set to OFF. In S1108, in the case where the bundle type is "login", or in other words, a login bundle, the process moves to S1109. In S1109, it is determined whether the login bundle is an embedded login bundle or a later-installed login bundle. Whether the login bundle is embedded or later-installed is assumed to be indicated in the management information held by the OSGi extension section 211 when the bundles are installed. Alternatively, the determination may be made based on a folder name of the bundle being processed. In the case of an embedded login bundle, the process moves to S1110 and the reloadable flag is set to ON. However, in the case of a later-installed login bundle, the process moves to S1111 and the reloadable flag is set to OFF.

The value of Action 702 read in S1103 is determined in S1112. In S1112, in the case where the value of Action 702 is "all", or in other words, indicates that the entire bundle directory is to be deleted, the process moves to S1115, and the entire bundle directory of the bundle being processed is deleted. In S1112, in the case where the value of Action 702 is "data", or in other words, indicates that the data folder is to be deleted, the process moves to S1116, where the data folder 407 directly below the bundle directory of the bundle being processed is deleted. In the case where the value of Action 702 is "jar", or in other words, indicates that the jar file is to be deleted, the process moves to S1113, where the value of the reloadable flag is determined. In S1113, in the case where the reloadable flag is ON, the process moves to S1114, and the jar file 406 immediately below the bundle directory of the bundle being processed is deleted. However, in S1113, in the case where the reloadable flag is OFF, the process moves to S1115, and the entire bundle directory of the bundle being processed is deleted. In S1117, it is determined whether or not the bundle being processed is the final bundle; in the case where the bundle is not the final bundle, the process returns to S1107 and is repeated. However, in the case where it is determined in S1117 that the bundle being processed is the final bundle, the process moves to S1118 and ends.

Although not indicated in FIG. 11, it should be noted that as described above, a reloadable jar file is reloaded in the process for restarting the image forming apparatus.

As described thus far, the bundle loading region in the image forming apparatus 130 can be erased in accordance with a designated clear type. Accordingly, in the case where a problem has arisen in a bundle, an effective method for deletion can be selected. For example, if "system" is designated in the bundle designation 701 and "jar" is designated in the action designation 702 (in other words, the clear type number of 1 in FIG. 9), the jar file of the deleted system bundle is reloaded, and thus after the bundle has been cleared, the image forming apparatus can be used in the same manner as before the bundle was cleared. If this does not solve the problem, next, for example, "system bundle" is designated in the bundle designation 701 and "data" is designated in the action designation 702, the data folder is deleted, and it is determined whether the image forming apparatus will operate normally after a restart; in this manner, the targets for clearing can be changed in stages in order to attempt to eliminate the error.

Second Embodiment

There are cases where bundles for use in manufacturing are installed when the image forming apparatus is assembled at a factory. In such a case, it is necessary to clear all of those bundles and restore the apparatus to a default state where no bundles are installed before shipping the apparatus from the factory. Accordingly, it has been necessary to erase the entire bundle loading region by executing a pre-shipping clear as a final task before shipping. On the other hand, to reduce the burden of installation and the like, it is conceivable to install general bundles that will be used frequently by a user, bundles that are to be promoted, and so on in advance at the factory. Such bundles are called "preinstalled bundles". However, there has been a problem that executing the pre-shipping clear as described above also erases such preinstalled bundles. For example, when the image forming apparatus is assembled, copying image data of firmware including preinstalled bundles prepared in advance to the hard disk 104 makes it possible to install the firmware in one operation, which makes it possible to improve productivity. In the case where such a production method is used, carrying out the pre-shipping clear after installing the preinstalled bundles is unavoidable. The present second embodiment describes a method for erasing the bundle loading region when shipping the apparatus from the factory, as a response to this problem.

FIG. 12 is a diagram illustrating a UI 1200 for designating a pre-shipping clear carried out when shipping from a factory. The factory menu UI 1200 is a menu for functions required for tasks performed in the factory. When pre-shipping clear 1201 is selected and an OK button 1202 is pressed while that selection is active, a pre-shipping clear is executed.

FIG. 13 is a diagram illustrating an example of the content of a clear designation file 1300 at the time of a pre-shipping clear. "Shipping_Clear", indicating the pre-shipping clear, is designated in TargetApp 1301. The action designation is not referred to in this case, and may therefore have any content, or no content at all. When the pre-shipping clear is designated, the clear designation file generating section 205 generates the clear designation file illustrated in FIG. 13 and stores the file in a predetermined location.

FIG. 14 is a diagram illustrating a manifest file 1400 in a bundle. A manifest file is present for each bundle. A version, property values of a jar file in the Java bundle, and so on are written in the manifest file. This content is written as manifest items and values corresponding thereto. Excepted bundle (OutOfShippingClear) 1401, indicating whether or not the bundle is excepted from the pre-shipping clear, is one of the items in the manifest, and a value of "true" being set indicates that the bundle is excepted from the deletion involved in the pre-shipping clear. On the other hand, in the case where the value is "false" or there is no OutOfShippingClear written, the bundle is a target for the deletion involved in the pre-shipping clear. Setting this OutOfShippingClear to "true" for a preinstalled bundle makes it possible to except that bundle from the pre-shipping clear.

The OSGi 210 holds the values written in the bundle manifest in a memory as management information. By using a bundle name of the bundle in question, the values of the items written in the manifest, and so on as keys, designating those keys makes it possible to obtain the associated values. Accordingly, using OutOfShippingClear as a key makes it possible to obtain those values from the management information.

Deletion Processing Sequence During Pre-Shipping Clear

Figure 15:
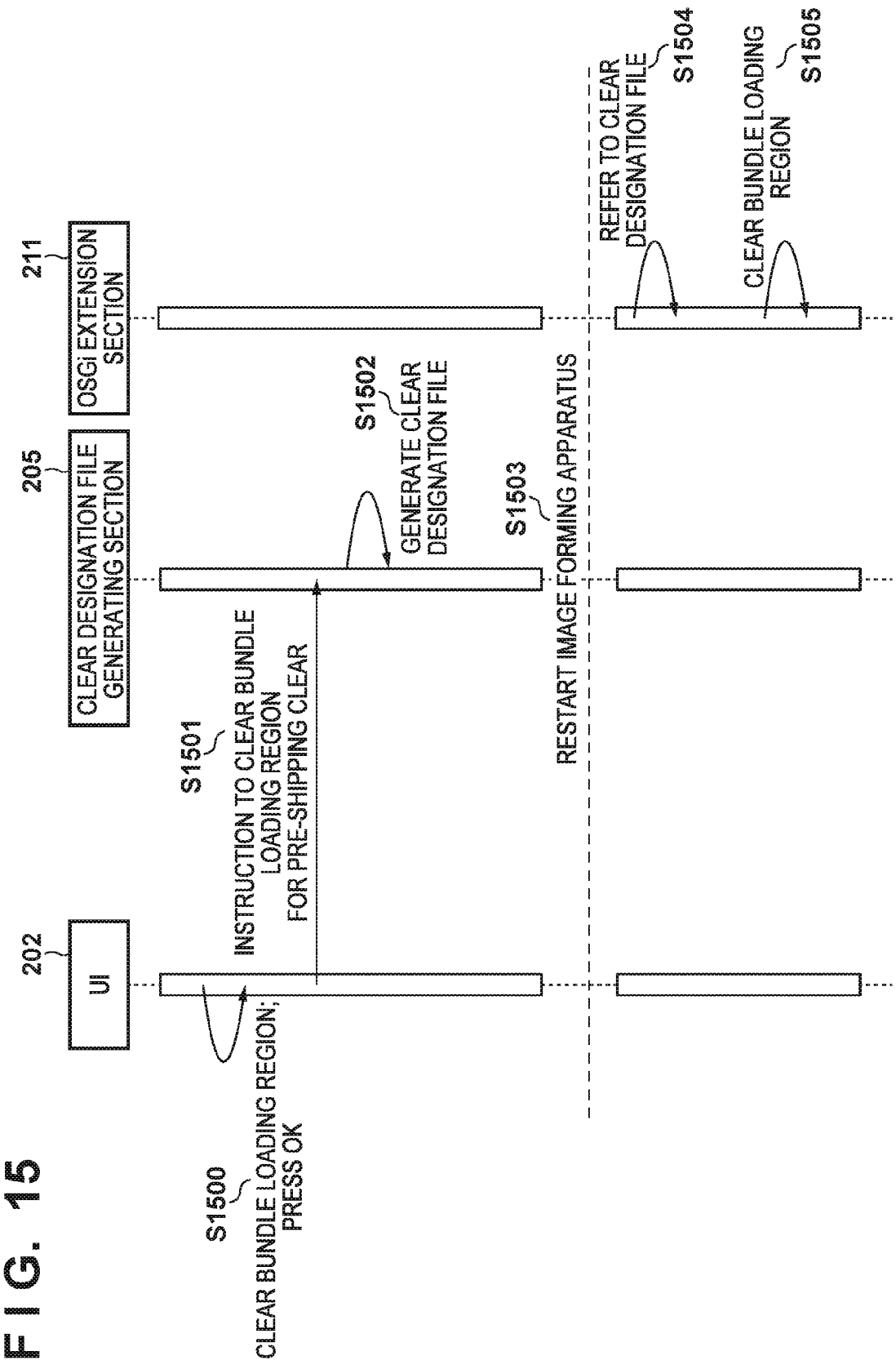
FIG. 15 is a sequence chart illustrating a sequence from the designation of the pre-shipping clear to a post-restart erasure process.

FIG. 15 is a sequence chart illustrating a sequence from the UI designation in the pre-shipping clear to a post-restart deletion process. In S1500, the user selects pre-shipping clear 1201 and presses the OK button while that selection is active. In S1501, the UI instructs the clear designation file generating section 205 to erase the bundle loading region for the pre-shipping clear. In S1502, the clear designation file generating section 205 generates the clear designation file 1300 in accordance with that instruction. In S1503, the user restarts the image forming apparatus 130. In S1504, the OSGi extension section 211 refers to the clear designation file 1300. In S1505, the OSGi extension section 211 erases the bundle loading region for the pre-shipping clear, executing the clear on the bundles for which OutOfShippingClear is set. A flow of the OSGi extension section 211 in S1504 and S1505 is illustrated in FIG. 16.

Figure 16:
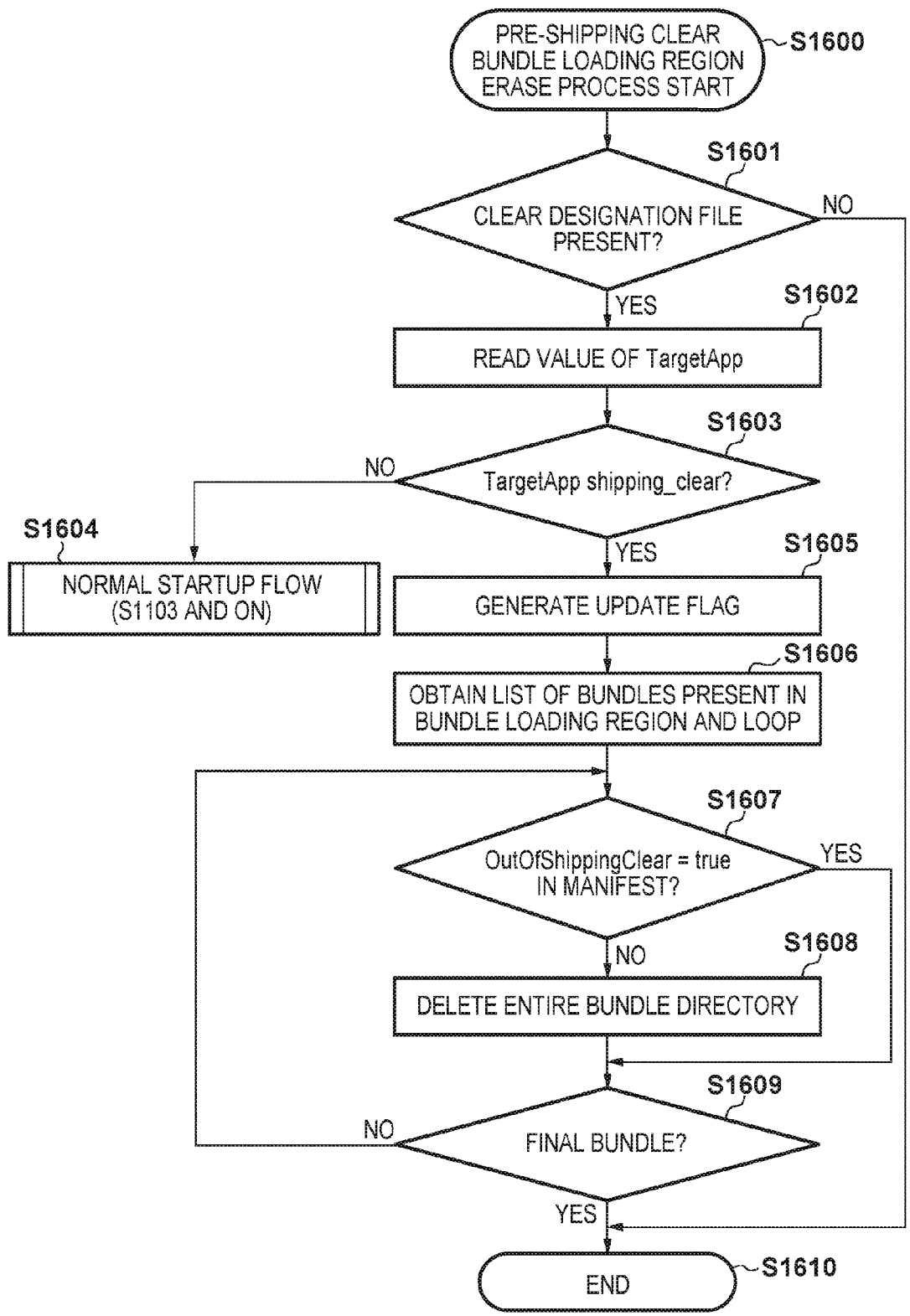
FIG. 16 is a flowchart illustrating a process carried out when an OSGi extension section 211 erases a bundle loading region during the pre-shipping clear.

FIG. 16 is a flowchart illustrating a process carried out when the OSGi extension section 211 erases the bundle loading region during the pre-shipping clear. S1600 to S1602 execute the same processes as S1100 to S1102 in FIG. 11. The bundle loading region deletion process is started in S1600. In S1601, the OSGi extension section 211 checks whether or not the clear designation file 1300 is present. The process advances to S1610 and ends in the case where the clear designation file 1300 is not present. However, the process advances to S1602 in the case where the clear designation file 1300 is present. In S1602, the OSGi extension section 211 reads the value of TargetApp 1301 and secures the value in memory, after which the process moves to S1603. In S1603, in the case where the value of TargetApp 1301 is "shipping_clear", the process moves to S1605, and the update flag is generated. As a result, a process for reloading from the firmware 401 is run in a subsequent startup process performed by the OSGi extension section 211. In S1603, in the case where the value of TargetApp 1301 is not "shipping clear", the process moves to S1604. The process then returns to the flow carried out during a normal startup, illustrated in FIG. 11, and continues being processed from S1103.

In S1606, the OSGi extension section 211 obtains a list of the bundles installed in the bundle loading region; the process then moves to S1607, where each bundle is taken as a bundle being processed, and a looped process is carried out for each bundle in sequence. In S1607, the OutOfShippingClear value of the manifest of the first bundle is checked to see if the value is "true". In the case where the value is "false" or OutOfShippingClear is not defined, the process moves to S1608, and the entire bundle directory of that bundle is set as a target for deletion. In the case where the OutOfShippingClear value is "true", the process moves to S1609, and no deletions are carried out for that bundle. In S1609, it is determined whether or not the bundle being processed is the final bundle; in the case where the bundle is not the final bundle, the process returns to S1607 and is repeated. However, in the case where it is determined in S1609 that the loop is at its end, the process moves to S1610 and ends.

According to the present second embodiment as described thus far, it is possible to erase the bundle loading region while leaving specific bundles. In this case, the OutOfShippingClear item in the manifest file of, for example, a preinstalled bundle is set, or in other words, is set to "true". By doing so, the pre-shipping clear can be realized, reloading the system bundles after the deletion without the preinstalled bundle being deleted.

Third Embodiment

Figure 17:
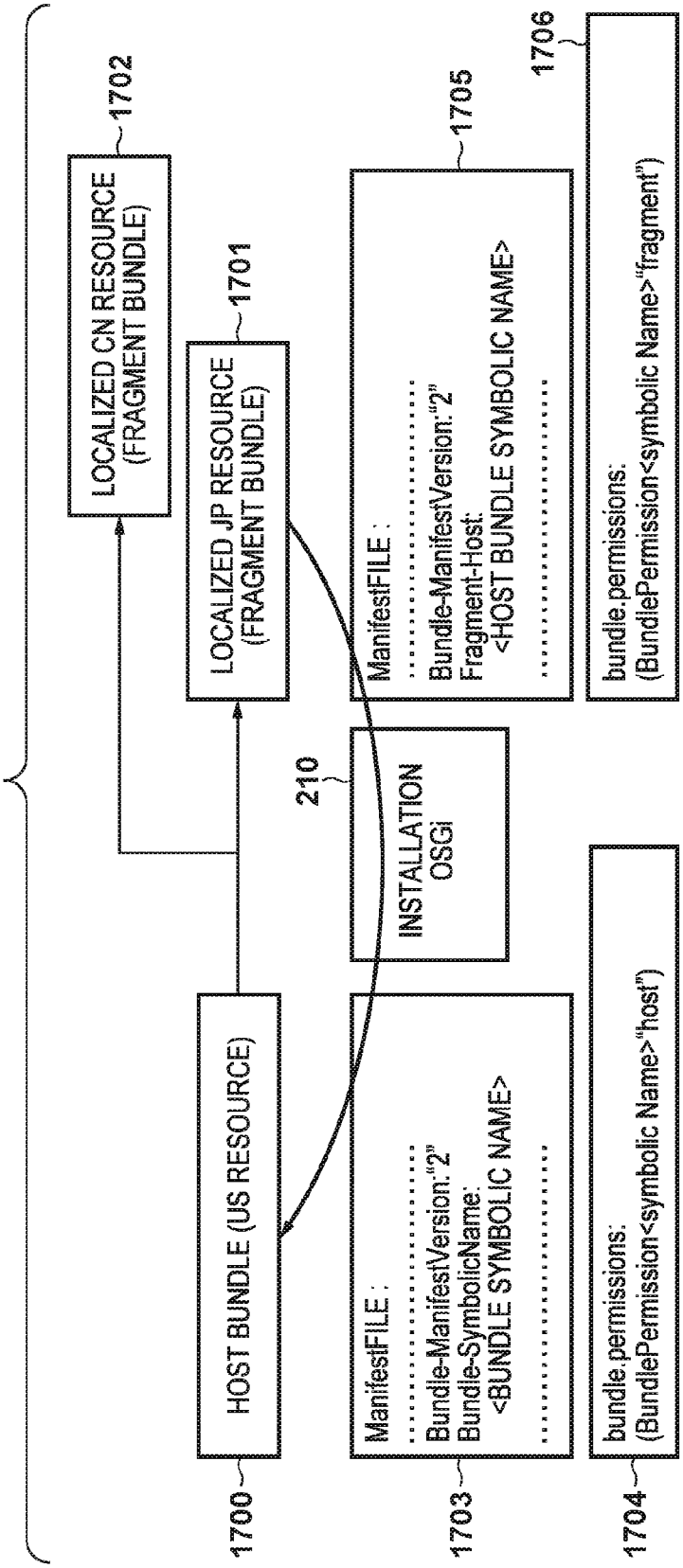
FIG. 17 is a conceptual diagram illustrating a fragment bundle.

From the present third embodiment and on, deletion methods that achieve efficiency by varying the units of deletion will be described considering use cases in which installed bundles are deleted. First, the deletion of a fragment bundle will be described. Bundles include a type of bundle called a fragment bundle. FIG. 17 is a diagram illustrating the concept of the fragment bundle. FIG. 17 illustrates an example in which fragment bundles 1701 and 1702 that hold language localization resources are installed for a host bundle 1700. To install a fragment bundle in a host bundle, the OSGi 210 requires that the following manifest and bundle permissions be designated. To describe briefly, a fragment bundle is a bundle (application) that is associated with a host bundle and runs in cooperation with that host bundle. Each fragment bundle can be installed and uninstalled on its own.

host bundle manifest 1703
2 is designated for Bundle-ManifestVersion. A name that is unique in the framework is given for Bundle-Symbolic-Name.

fragment bundle manifest 1705
2 is designated for Bundle-ManifestVersion. The <host bundle symbolic name> written in the host bundle manifest 1703 is designated for Fragment-Host. These values matching indicates that the host bundle and the fragment bundle are elements of the same bundle.

host bundle permissions 1704
BundlePermission [bundle symbolic name, HOST]

fragment bundle permissions 1706
BundlePermission [bundle symbolic name, FRAGMENT]

When a fragment bundle is installed with the above conditions met, the OSGi 210 specifies the host bundle from the manifest information of the fragment bundle and adds the class path of the fragment bundle itself to the class path of the host bundle. Here, "class path" is an item designating where the Java VM is to read a class file from when the Java bundle is executed. Furthermore, all classes and resources within the fragment bundle are loaded by a class loader of the host bundle. Here, "class loader" is an object that handles the loading of classes, searching for resources, and so on, and all classes can be loaded into the Java VM by the class loader and used from the bundle.

In this example, a Japanese language resource 1701 and a Chinese language resource 1702 serving as fragment bundles are installed in the host bundle 1700 serving as the main entity, and the host bundle 1700 can then switch the language of resources using those Japanese language and Chinese language resources. In other words, although the display in the UI of the host bundle is in English, designating a resource switch through the UI of the host bundle makes it possible to create the host bundle to display Japanese, display Chinese, or the like. In addition to the language resources described here, it is also possible to switch image resources. Accordingly, although it is standard to use an English-language display image, designating a resource switch through the UI of the host bundle makes it possible to switch to a Japanese- or Chinese-language display image. Fragment bundles are often used to switch resources in this manner.

Figure 18:
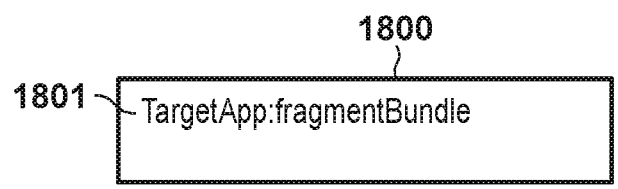
FIG. 18 is a diagram illustrating an example of the content of a clear designation file for a fragment bundle.

As described in this example, the fragment bundles often hold multiple language resources, and there are cases where those resources are to be deleted so that a bundle can be evaluated without considering the influence of such resources. In such a case, the fragment bundles may be uninstalled one at a time, but it is also possible to delete the fragment bundles all at once by specifying such an operation in the clear designation file, as illustrated in FIG. 18. FIG. 18 is a diagram illustrating an example of the content of a clear designation file 1800 designating the deletion of a fragment bundle. TargetApp1801, which is the bundle designation, designates fragmentBundle, indicating that the fragment bundle is the target for deletion. Although not described here, rather than directly writing the bundle designation, for example, designating a clear type number through a user interface as in the first embodiment may be enabled so that when a specific number has been designated, "fragment-Bundle" is written into the bundle designation 1801 of the clear designation file.

Flow of Deletion of Fragment Bundle

Figure 19:
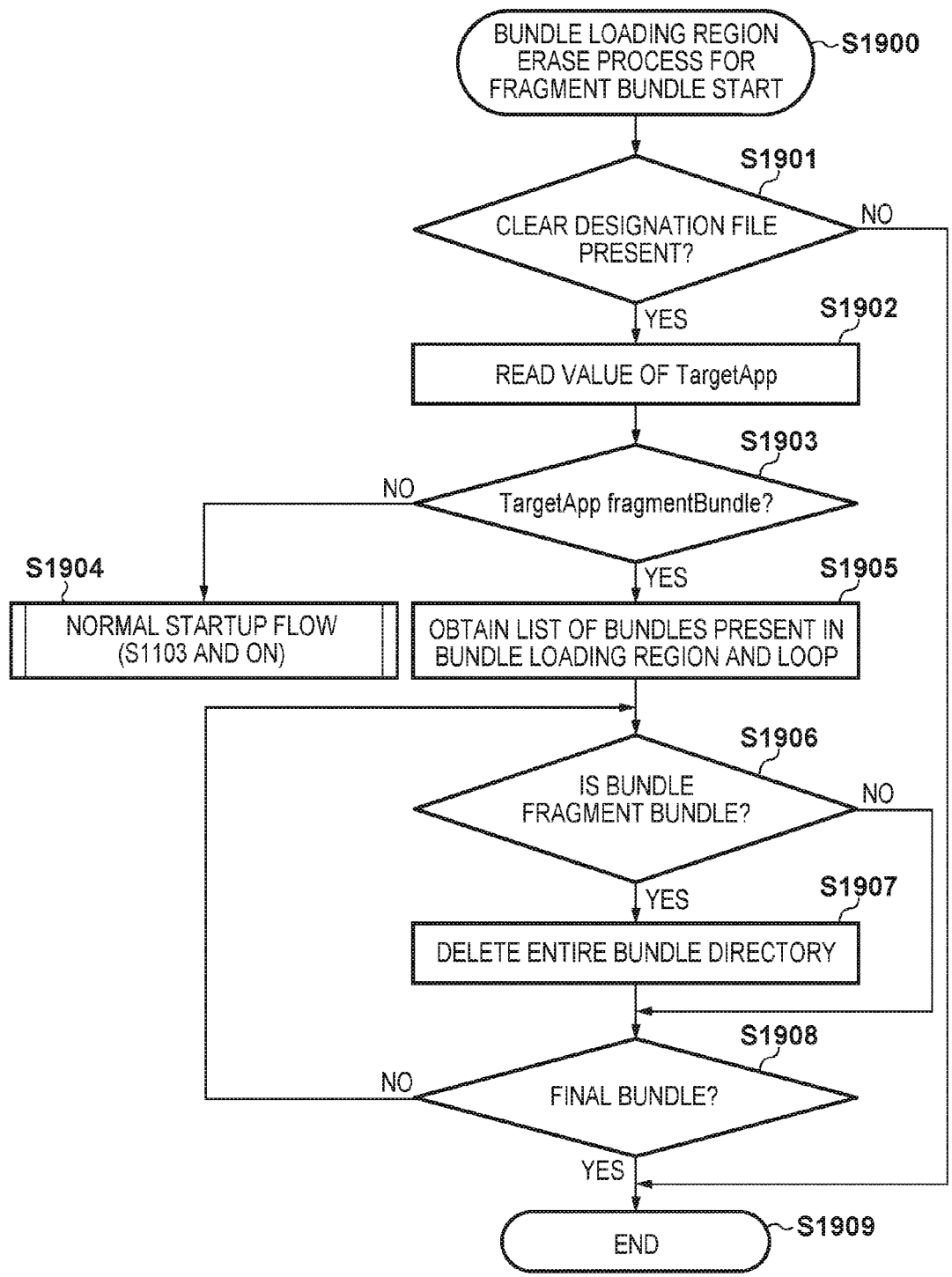
FIG. 19 is a flowchart illustrating a process carried out when an OSGi extension section 211 erases a bundle loading region when a fragment bundle is designated.

FIG. 19 is a flowchart illustrating a process carried out when the OSGi extension section 211 erases the bundle loading region with a fragment bundle serving as the target of deletion. S1900 to S1902 execute the same processes as S1600 to S1602 in FIG. 16, and thus descriptions thereof will be omitted. In S1903, in the case where the value of TargetApp 1801 is "fragmentBundle", the process moves to S1905, and the update flag is generated. As a result, a process for reloading from the firmware 401 is run in a subsequent startup process performed by the OSGi extension section 211. In S1903, in the case where the value of TargetApp 1801 is not "fragmentBundle", the process moves to S1904. The process then returns to the flow carried out during a normal startup, illustrated in FIG. 11, and continues being processed from S1103. At S1904, the process may instead branch to S1603 in FIG. 16.

In S1905, the OSGi extension section 211 obtains a list of the bundles installed in the bundle loading region; the process then moves to S1906, where a loop process is carried out for each bundle. In S1906, it is checked whether or not the first bundle is a fragment bundle. A bundle can be determined to be a fragment bundle if there is a fragment host item in the manifest file or the bundle permissions 1706 are "fragment", for example. In the case where the bundle being processed is a fragment bundle, the entire bundle directory of that bundle is set as a target for deletion. In the case where the bundle being processed is not a fragment bundle, the process moves to S1908, and no deletions are carried out for that bundle. In S1908, it is determined whether or not the bundle being processed is the final bundle; in the case where the bundle is not the final bundle, the process returns to S1906 and is repeated. However, in the case where it is determined in S1908 that the loop is at its end, the process moves to S1909 and ends.

According to the present third embodiment as described thus far, it is possible to erase the bundle loading region targeting only fragment bundle for deletion. Although fragment bundles are handled in this example, it should be noted that other types of bundles can of course be set as targets for deletion.

Fourth Embodiment

Continuing from the third embodiment, a deletion method that achieves efficiency by varying the units of deletion will be described considering a use case in which a bundle is deleted. The embodiment will describe a deletion method in which a bundle ID is designated. A bundle manifest file always has a unique bundle ID. Accordingly, a bundle can be specified if the bundle ID of that bundle is known. As such, in a case such as where the data folder of a given bundle is to be deleted, combining the action designation (Action) 702=data indicated in FIG. 7 with the bundle ID makes it possible to delete only the data of a specific bundle. For example, a clear type number for inputting the bundle ID is determined in advance in the user interface illustrated in FIG. 6. The configuration may be such that when that number is designated, the ID is accepted through a bundle ID input field, and the input ID is written into the clear designation file.

Figure 20:
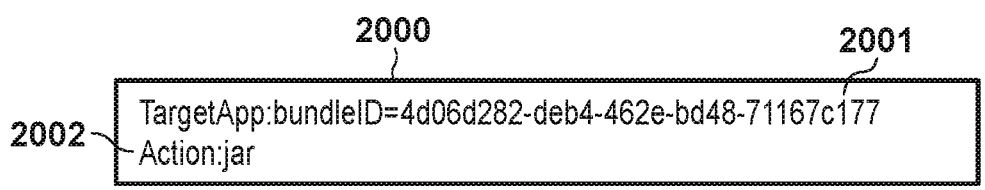
FIG. 20 is a diagram illustrating an example of the content of a clear designation file with a bundle ID designation.

FIG. 20 is a diagram illustrating an example of the content of a clear designation file 2000. Bundle designation 2001 (TargetApp) designates the bundle ID of the bundle that is the deletion target. As indicated here, the bundle ID is designated after the character string "bundleID", for example. Action designation (Action) 2002 designates the details to be executed on the bundle that is the deletion target. The flow of a process carried out when the OSGi extension section 211 erases the bundle loading region upon startup is the same as those illustrated in FIGS. 11 and 19, and thus details thereof will be omitted. As a process carried out in response to a designation in TargetApp 2001, if the bundle ID of the bundle matches the bundle ID designated in TargetApp 2001 in S1906, that bundle is set as a target for deletion. Meanwhile, the same processes as those from S1112 to S1116 are carried out as a process carried out in response to a designation in Action 2002. In other words, although the type of the bundle is designated in the first embodiment, the bundle ID is instead designated in the present embodiment.

According to the present fourth embodiment as described thus far, it is possible to delete the data folder of a bundle within the bundle loading region using a bundle having a specific bundle ID as a target for deletion.

Fifth Embodiment

Continuing from the third and fourth embodiments, a deletion method that achieves efficiency by varying the units of deletion will be described considering a case in which a bundle is deleted. The embodiment will describe a deletion method in which a bundle status is designated. An installed bundle has a status such as start/stop or the like. This status is managed by OSGi 210, and the status can be obtained by the OSGi extension section 211. A stopped bundle can be treated as a bundle that is not being used, and thus a use case in which the data of an unused bundle is deleted in order to free up storage will be considered.

Figure 21:
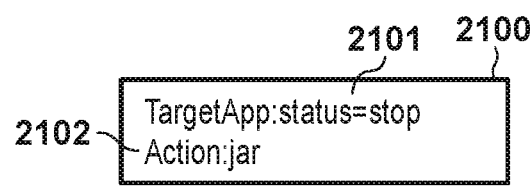
FIG. 21 is a diagram illustrating an example of the content of a clear designation file with a bundle status designation.

FIG. 21 is a diagram illustrating an example of the content of a clear designation file 2100 having a bundle status designation. A value indicating a status is designated in TargetApp 2101. Here, "stop" is designated as the status after the character string "status=", which indicates that the bundle is stopped. Action 2102 designates the details to be executed on the bundle that is the deletion target.

The flow of a process carried out when the OSGi extension section 211 erases the bundle loading region upon startup is the same as those illustrated in FIGS. 11 and 19, and thus details thereof will be omitted. As a process carried out in response to a designation in TargetApp 2100, the status of the bundle is determined in S1906, and if the status matches the status designated by TargetApp 2100, that bundle is set as a target for deletion. Meanwhile, the same processes as those from S1112 to S1116 are carried out as a process carried out in response to a designation in Action 2002.

According to the present fifth embodiment as described thus far, it is possible to delete the data folder of a bundle within the bundle loading region using a bundle having a specific state as a target for deletion.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115039, filed Jun. 5, 2015, which is hereby incorporated by reference herein in its entirety.

What is claimed is:

1. An image forming apparatus capable of adding and deleting applications, the image forming apparatus comprising:
   a designating unit configured to designate an application and a file to be deleted; and
   a deleting unit configured to delete a designated file associated with the application designated by the designating unit,
   wherein in the case where (1) the designating unit designates an application that has, as an application type, either (a) a system application that can be reloaded, wherein the system application is an application embedded in a system or (b) a login application that can be reloaded, wherein the login application is an application executed at the time of a login and (2) the designating unit designates a file that has, as a file type, a program for the application, the deleting unit deletes that program, and
   wherein in the case where (1) the designating unit designates an application that has, as an application type, either (a) a general application that cannot be reloaded, wherein the general application is an application other than a system application or a login application or (b) a login application that cannot be reloaded and (2) the designating unit designates a file that has, as a file type, a program for the application, the deleting unit deletes a folder that contains that program and data of that program.

2. The image forming apparatus according to claim 1, wherein the designating unit designates the application on the basis of the application type.

3. The image forming apparatus according to claim 1, wherein the designating unit designates the application and the file by designating a code indicating a combination of the application type and the file type.

4. The image forming apparatus according to claim 3, wherein the designating unit includes a user interface for inputting the code.

5. The image forming apparatus according to claim 1, wherein the file type that can be designated by the designating unit includes at least one of (a) a program for the application and (b) data.

6. The image forming apparatus according to claim 5, wherein in the case where data is designated, by the designating unit, as the file type, the deleting unit deletes data of the designated application.

7. The image forming apparatus according to claim 5, wherein in the case where (a) a system application or a login application that can be reloaded is designated, by the designating unit, as the application type, and (b) a program and data are designated as the file type, the deleting unit deletes a folder that contains that program and data of that program.

8. The image forming apparatus according to claim 1, further comprising:
a reinstalling unit configured, in the case where a program of an application of a system application type that can be reloaded or a login application type that can be reloaded has been deleted by the deleting unit, to reinstall the deleted program after a restart.

9. The image forming apparatus according to claim 1, wherein the designating unit can designate a predetermined specific application, and
wherein in the case where the predetermined specific application has been designated, the deleting unit deletes a folder containing the program and data of the predetermined specific application.

10. The image forming apparatus according to claim 9, wherein the predetermined specific application is associated with information indicating that the application is the predetermined specific application, and
wherein the deleting unit specifies the predetermined specific application on the basis of the information.

11. The image forming apparatus according to claim 10, wherein the predetermined specific application is a fragment bundle that operates in cooperation with another application.

12. The image forming apparatus according to claim 1, wherein the designating unit can designate the application using an ID of the application, and
wherein the deleting unit deletes a designated file for the application.

13. The image forming apparatus according to claim 1, wherein the designating unit can designate the application using a status of the application, and
wherein the deleting unit deletes a designated file for the application.

14. The image forming apparatus according to claim 1, wherein the designating unit can designate the application using a status of the application, and
wherein the deleting unit deletes a designated file for the application.

15. The image forming apparatus according to claim 1, further comprising:
a platform for executing the application; and
a library for enabling the application to use a function provided by the image forming apparatus.

16. The image forming apparatus according to claim 1, wherein the general application is an application for image processing, and wherein the system application is an application for managing an application.

17. A method for deleting an application in an image forming apparatus capable of adding and deleting applications, the method comprising:
designating an application and a file to be deleted; and
deleting a designated file associated with the application designated in the step of designating,
wherein in the case where (1) an application is designated that has, as an application type, either (a) a system application that can be reloaded, wherein the system application is an application embedded in a system or (b) a login application that can be reloaded, wherein the login application is an application executed at the time of a login and (2) a file is designated that has, as a file type, a program for the application, that program is deleted in the deleting, and
wherein in the case where (1) an application is designated that has, as an application type, either (a) a general application that cannot be reloaded, wherein the general application is an application other than a system application or a login application or (b) a login application that cannot be reloaded and (2) a file is designated that has, as a file type, a program for the application, a folder that contains that program and data of that program are deleted in the deleting.

18. A non-transitory computer-readable medium on which is recorded a program for causing a computer capable of adding and deleting an application to function as:
a designating unit configured to designate an application and a file to be deleted; and
a deleting unit configured to delete a designated file associated with the application designated by the designating unit,
wherein in the case where (1) the designating unit designates an application that has, as an application type, either (a) a system application that can be reloaded, wherein the system application is an application embedded in a system or (b) a login application that can be reloaded, wherein the login application is an application executed at the time of a login and (2) the designating unit designates a file that has, as a file type, a program for the application, the deleting unit deletes that program, and
wherein in the case where (1) the designating unit designates an application that has, as an application type, either (a) a general application that cannot be reloaded, wherein the general application is an application other than a system application or a login application or (b) a login application that cannot be reloaded and (2) the designating unit designates a file that has, as a file type, a program for the application, the deleting unit deletes a folder that contains that program and data of that program.

* * * * *